United States Patent [19]

Mallow

[11] Patent Number: 5,352,288

[45] Date of Patent: Oct. 4, 1994

[54] LOW-COST, HIGH EARLY STRENGTH, ACID-RESISTANT POZZOLANIC CEMENT

[75] Inventor: William A. Mallow, Helotes, Tex.

[73] Assignee: Dynastone LC, San Antonio, Tex.

[21] Appl. No.: 73,346

[22] Filed: Jun. 7, 1993

[51] Int. Cl.⁵ .............................................. C04B 7/02
[52] U.S. Cl. ................................. 106/605; 106/606; 106/611; 106/612; 106/676; 106/677; 106/707; 106/716; 106/724; 106/737; 106/DIG. 2
[58] Field of Search ............... 106/624, 667, 704, 707, 106/708, 714, 721, 791, 792, 692, 716, 724, 737, 709, 672, 676, 677, 605, 606, 611, 612, DIG. 2; C04B 7/02

[56] References Cited

U.S. PATENT DOCUMENTS

| | | | |
|---|---|---|---|
| 2,900,265 | 8/1959 | Klein | 106/708 |
| 4,306,912 | 12/1981 | Forss | 106/791 |
| 4,504,320 | 3/1985 | Rizer et al. | 106/708 |

*Primary Examiner*—Mark L. Bell
*Assistant Examiner*—Paul Marcantoni
*Attorney, Agent, or Firm*—John L. Sigalos

[57] ABSTRACT

A low cost cement composition that can be admixed with water and hydrothermally closed cured to give acid-resistant products of high compressive strength consisting essentially of, in parts by weight, 1 to 1.5 parts of a calcium oxide material containing at least about 60% CaO, 10 to 15 parts of pozzolanic material containing at least about 30% by weight amorphous silica, and 0.025 to 0.075 parts by weight of an alkali metal catalyst and building materials made therefrom as well as the method of making such building materials by closed curing.

21 Claims, No Drawings

LOW-COST, HIGH EARLY STRENGTH, ACID-RESISTANT POZZOLANIC CEMENT

BACKGROUND OF THE INVENTION

The present invention relates to low cost, acid-resistant, high early strength hydrothermally cured pozzolanic cement compositions, preferably ones that are also lightweight, which are capable of being used after being admixed with water to form building floors, walls, and the like and also processed into building materials such as brick, cinder block, roofing and flooring tile, monolithic slabs, concrete pipe, utility poles, and the like from essentially indigenous industrial and/or biogeneric waste by-products.

In many areas of the United States and more often in other areas of the world such as third-world countries, it is difficult to find low-cost, lightweight, high strength building materials which are fire resistant, environmentally stable, and which have structural integrity so as to provide sturdy and affordable living units.

There is also the concomitant problem of ecologically sound disposal of industrial and agricultural by-product waste materials. These include kiln dust, fly ashes; biogeneric wastes, such as bagasse ash, rice hull ash, and other siliceous materials such as fume silica, a by-product resulting from the production of silicon and zircon.

There have been numerous efforts in the past to utilize large percentages of such materials in compositions to make structural elements such as building blocks, brick, roofing tile, and the like. However, it has been difficult to obtain suitable products since they either lack the strength necessary for structural integrity and-/or they cannot be properly cured to the requisite strength under ambient conditions. They must be fired or cured using kilns or other heat processing conditions to obtain the necessary strength or allowed to age for extended periods to achieve the actual degree of cure. The need for fuel to provide the heat and expensive equipment greatly increases the costs, making such structural products economically unavailable. Also, the burning of the fuels again creates a pollution problem. Long term ambient curing requires costly investment in large storage facilities to accommodate accumulating products.

Numerous efforts have been made to overcome this problem including utilization of catalysts in order to increase the rate of strength development of products made from pozzolans. This is disclosed, for example, in U.S. Pat. Nos. 3,990,903 and 4,432,800. In every instance, however, it has not been possible to achieve through hydrothermal reaction at ambient temperatures resultant finished cured cements and building materials which have the necessary high early strength suitable for the mass production of structurally sound structures.

"Hydrothermally cured pozzolanic cement", as that term is used herein, is defined to mean one that is closed cured and achieves its strength by the absorption or consumption of energy (ambient or higher) from its environment, facilitating the conversion of activated or reactive silica-based materials to polyvalent or divalent metal silicates of adhesive or cohesive nature.

It is the cohesive/adhesive or binding properties of the reaction products that provides the structural integrity of hydrothermally cured cements.

SUMMARY OF THE INVENTION

The present invention overcomes the above-noted problems and provides hydrothermally cured pozzolanic cements capable of forming strong and durable cements and building materials by hydrothermal processing at temperatures as low as 20° C., which materials are of low cost, high strength, acid-resistant, fire-resistant and can also be lightweight. These cements are made primarily from industrial and/or biogeneric by-products or what are considered to be waste materials as well as naturally occurring or modified siliceous materials. Moreover, such low cost, high strength, acid-resistant, lightweight, fire-resistant, and durable structural materials utilizing by-product wastes and otherwise ecologically penalizing raw materials can be made without polluting the environment and can be used to make affordable dwellings even for the poorest societies in the world. The pozzolanic cements of the present invention can also be closed cured at elevated temperatures (autoclaving) if desired.

The present invention permits the attainment of high early compressive strengths not heretofore obtainable on building materials made from pozzolanic materials. By way of example, concrete blocks made in accord with the present invention have a compressive strength of over 6,000 psi which can be achieved by closed curing at ambient temperature (7 days at 25° C.) or in a few hours at elevated temperatures (4 hours at 100° C. or 1 hour at 150° C.).

Briefly, the present invention comprises a low cost, high early strength forming, hydrothermally processable pozzolanic cement composition consisting essentially of, in parts by weight, 1 to 1.5 parts of a calcium oxide material containing at least about 60% calcium oxide or hydroxide, 10 to 20 parts of pozzolanic material, and 0.025 to 0.075 parts of an alkali metal salt catalyst.

The invention also comprises such pozzolanic cement compositions capable of forming lightweight products which include expanded fillers and resultant building materials as well as the method of making the same as hereinafter described.

DETAILED DESCRIPTION

The essential materials in the present invention are the calcium oxide material, pozzolanic material, and the catalyst used in the proportions noted. An additional component, an expanded filler, can be utilized if the cement of the instant invention is not to be utilized in products which require high impact strength, such as roofing tiles or in floors. For example, such fillers can be included in cements to make cement blocks and brick used to form walls.

As used herein, the term "calcium oxide material" means any material containing sufficient reactive CaO or Ca(OH)$_2$ to react with the pozzolan and achieve the desired strength. It is preferably a waste material such as kiln dust although quick lime or slake lime can also be used. The preferred kiln dust is one having at least 90% of its particles below 325 mesh (44 microns), preferably 5 to 20 microns in size, and over 30% reactive CaO or Ca(OH)$_2$.

As to the pozzolanic material it must contain at least 30% by weight, preferably over 45%, of amorphous silica or vitreous silica. Here again, industrial as well as biogenetic by-products or waste materials as well as locally available natural pozzolans can be used for this purpose. Examples of the industrial type materials are fly ash, blast furnace slag and fume silica. It is preferred to use Class F fly ash since use of Class C fly ash limits the pot life or working time and ratio of water to the cement that can be utilized in making the suitable finished products. Some Class C fly ash can be tolerated without interfering with the desired properties. Examples of biogenetic materials are bagasse ash and rice hull ash. Suitable naturally occurring raw materials include volcanic ash, diatomaceous earth, calcined fuller's earth, diatomaceous silica, and amorphous silica.

With respect to the alkali metal catalysts, the hydroxides and silicates disclosed in U.S. Pat. No. 3,990,903 can be utilized, but it is preferred to use sodium and potassium hydroxides. The particular one utilized will depend, in the poorest areas of the world, on the most readily available, inexpensive option.

In addition to these three main components, certain others can be added for particular purposes.

Thus, as noted above, expanded fillers can be added for forming lightweight cinder block and tile and these include materials such as hollow glass cenospheres, sold commercially as EXTENDOSPHERES, that are obtained by floating them off fly ash. In addition, perlite, expanded polystyrene beads, glass or polymer microspheres, vermiculite, and the like can also be used. The amount of expanded filler added can vary widely dependent upon the density and strength desired in the final product. Again, the optimum amounts for any given product can be determined by routine experimentation.

If desired, small amounts of portland cement, high alumina cement, or plaster cement can be included to give the necessary green strength to the particular formed product (cinder block, brick, tile or the like) after it is formed to make the thus-formed product easier to handle without danger of breaking or deforming before the product has hydrothermally cured.

If desired and available and dependent upon the particular building material to be made, fillers such as sand, silica flour, mullite, aggregate, and the like can be added in varied amounts for their usual effect as a grog to reduce plasticity or as low cost extenders. Also fibers, whether mineral or vegetable, such as ceramic, graphite, or plant fibers can be added to give added strength and impact resistance to the products formed, such as roofing tile and floor tile, from the composition. Addition is in minor amounts and again determined by routine experimentation as to the optimum amount for any given composition and properties desired in the final cured product.

It has been found that if the compositions are to be extruded in conventional extruders commercially used to form ceramic tile and the like, the best operation of the extruders to form suitable products is achieved if plasticizing clays are included to give the plasticity and cohesiveness necessary for satisfactory extrusion. Such clays include any suitable for brick manufacture such as kaolin and shales as well as montmorillonites and betonites such as sodium or calcium bentonite. For such extrusion it is preferred to add the amount required for any given formulation and particular commercial extruder utilized which will give the cohesiveness required. This can be determined by routine experimentation for any given formulation and extruder.

It is also possible to include a high range water reducer (HRWR) or of some other fluidizing agent in the composition in its usual amounts and for its usual effect; i.e., to reduce the ratio of water required to form the product. These are also known as super plasticizers and are usually cycloaliphatic lignosulfonate derivatives or condensed naphthalene sulfonates such as the commercially available DARACEM 100 (Dow Chemical Co.) and LOMAR D (Diamond Shamrock Corp.)

Water, of course, is mixed with the composition in the amount required to process the composition for the use sought, after the dry components discussed above have all been thoroughly admixed. Here again, the amount of water depends on whether the pozzolanic cement is going to be formed into a floor or wall or into building products such as cinder block, brick, roofing tile or the like by molding, extrusion, or compaction. The particular amount of water utilized for any given particular composition and manufacturing procedure is readily determined by routine experimentation.

The table below shows operative and preferred ranges of the various components.

| Components | Parts by Weight | |
| --- | --- | --- |
| | Operative | Preferred |
| Calcium Oxide Material | 20–60 | 50 |
| Pozzolanic Material | 400–650 | 550 |
| Alkali Metal Hydroxide or silicate | 0.5–3 | 1 |
| Expanded filler* | 0–300 | 7 or 250 |

*In the case of the use of expanded filler the operative ratio is 0–10 and preferred ratio is 7 for polystyrene beads and for mineral fillers, respectively, 0–300 and 250.

As to the cement the operative range is 0–160, preferably 75–85 and as to the HRWR the ratios are 0.25 to 0.75 parts by weight per 100 parts by weight cementitious binder. Sand, gravel, and rock (the usual concrete aggregates) some of which are calcareous can be added when concrete products are preferred.

What is significant about this invention is that the compositions when mixed with water can be easily extruded, compression molded, or cast into simple or complex shapes and can achieve significant compressive strengths in a few hours when close cured at ambient temperature. Compression strengths of over 2,000 psi at 55 pcf density, to over 3,000 psi at 65 pcf density, and to over 6,000 psi at 110 pcf are achieved in 24–72 hours by utilizing hydrothermally closed cure of the constituents noted and by operating within the ratio of the constituents noted above. It will be evident that the higher the temperature and the relative humidity, the more rapid the attainment of the higher compressive strengths, although the instant compositions can be closed cured under hydrothermal conditions ranging from 20° C.>90% relative humidity to over 300° C.>90% relative humidity.

It is preferred during manufacture to operate at the highest temperature practical and in those areas where heating devices (steam tunnels and the like) are not available, such as in some third-world areas of the world, it simply takes a longer period of time to attain the necessary strength. By way of example, at a temperature of 25° C., a seven day closed cure is required to achieve approximately 70% of the ultimate strength whereas a four hour exposure at 100° C. and approaching 100% relative humidity will achieve 75% of the ultimate strength.

The invention will be further described in connection with the following examples which are set forth for purposes of illustration only.

In Examples 1 to 12 the compositions were formed into approximately 2 inch cubes and tested in accordance with the test procedure set forth in ASTM C109. Examples 13 to 15 were carried out using a commercial ceramic tile extruder and the resultant extrudates tested using the procedure set forth in ASTM C396.

EXAMPLE 1

| Example 1 | |
|---|---|
| Components | Parts by Weight |
| Kiln Dust* | 50 |
| Class F Fly Ash | 500 |
| Fume Silica | 50 |
| Portland Cement | 140 |
| Sodium Hydroxide | 2 |
| HRWR (DARACEM 100) | 0.5 |
| Expanded Styrene Beads | 7 |
| Water | 160 |

*Over 60% calcium oxide.

All the components, except for the water, were first thoroughly admixed and then the water was added. Portions of the mixture were molded into 2 inch cubes, allowed to remain covered to avoid evaporation for 6–8 hours, and then immersed into boiling water or simply stored in a closed container to prevent drying until the desired strength was attained. At 75° F. the shaped product attained over 2,000 (±100) psi compressive strength (typically 2,500) in 7 days at a wet density of 65 pcf, which upon equilibrium drying attained 55 pcf.

When boiled for four hours after setting, and while retained in a water-tight closure (plastic bag), the shapes exhibited 1700–1800 psi and subsequently continued to cure under ambient closed conditions to over 2,000 psi.

EXAMPLE 2

| Example 2 | |
|---|---|
| Components | Parts by Weight |
| Kiln Dust | 50 |
| Class F Fly Ash | 500 |
| Fume Silica | 50 |
| Portland Cement | 140 |
| Sodium Hydroxide | 2 |
| HRWR (DARACEM 100) | 0.5 |
| Expanded Styrene Beads | 7 |
| Water | 160 |
| Ceramic or Graphite Fiber* | 12 |

*Chopped to approximately ⅛–½" lengths.

The components were admixed and molded into 2 inch cubes, utilizing the procedures set forth in Example 1. The resultant product had a compressive strength of 2,000 psi±100) at 65 pcf wet density.

EXAMPLE 3

| Example 3 | |
|---|---|
| Component | Parts by Weight |
| Kiln Dust | 50 |
| Class F Fly Ash | 500 |
| Fume Silica | 50 |
| Portland Cement | 140 |
| Sodium Hydroxide | 2 |
| HRWR (DARACEM 100) | 0.5 |
| Cenospheres* | 260 |
| Water | 160 |

*Floated from fly ash.

The process and test procedure of Example 1 were followed and the resultant cement products (2 inch cubes) were 60 pcf (dry at equilibrium) products having over 3,000 psi compressive strength which resist excursions to 1800° F. with minimal damage to the shape structure.

EXAMPLE 4

| Example 4 | |
|---|---|
| Components | Parts by Weight |
| Kiln Dust | 50 |
| Class F Fly Ash | 500 |
| Fume Silica | 50 |
| Portland Cement | 140 |
| Sodium Hydroxide | 2 |
| HRWR (DARACEM 100) | 0.5 |
| Cenospheres | 260 |
| Water | 160 |
| Ceramic or Graphite Fiber* | 10 |

*⅛–½" length.

The process and test procedures of Example 1 were followed and the resultant 2 inch cubes had a compressive strength of 3,160 psi at 67 pcf wet density.

EXAMPLE 5

| Example 5 | |
|---|---|
| Components | Parts by Weight |
| Kiln Dust | 50 |
| Class F Fly Ash | 500 |
| Fume Silica | 50 |
| Portland Cement | 140 |
| Sodium Hydroxide | 2 |
| HRWR (DARACEM 100) | 0.5 |
| Water | 145 |

The procedure of Example 1 was followed.

This results in a cured product (2 inch cubes) with compressive strengths of 6,000–7,000 psi at 100–110 pcf after four hours at boiling or two weeks at ambient temperature in a closed cure environment.

EXAMPLE 6

The components and procedure of each of Examples 1 to 5 are used and followed except that potassium hydroxide is substituted for the sodium hydroxide. Substantially equivalent compressive strengths are obtained.

Also when levels of such sodium or potassium hydroxide are lowered to 1 part by weight substantially the same strengths are obtained.

EXAMPLE 7

| Example 7 | |
|---|---|
| Components | Parts by Weight |
| Kiln Dust | 50 |
| Class F Fly Ash | 500 |
| Fume Silica | 50 |
| Portland Cement | 140 |
| Sodium Hydroxide | 2 |
| HRWR (DARACEM 100) | 0.5 |
| Water | 145 |
| Ceramic or Graphite Fiber* | 10 |

*⅛–½" length.

The procedure of Example 5 was repeated, but with the addition of the fibers. The test results showed the same compressive strengths and density, as those of Example 5, but an improved impact strength due to the addition of the fibers.

EXAMPLE 8

| Example 8 | |
|---|---|
| Components | Parts by Weight |
| Kiln Dust | 50 |
| Class F Fly Ash | 500 |
| Fume Silica | 50 |
| Portland Cement | 140 |
| Sodium Hydroxide | 2 |
| HRWR (DARACEM 100) | 0.5 |
| ¼" Perlite | 175 |
| Water | 205 |

The procedure of Example 1 was followed and the resultant 2 inch cubes had a dry (equilibrated) density of 65 pcf with 1700 psi compressive strength.

EXAMPLE 9

| Example 9 | |
|---|---|
| Components | Parts by Weight |
| Kiln Dust | 50 |
| Class F Fly Ash | 500 |
| Fume Silica | 50 |
| Portland Cement | 140 |
| Sodium Hydroxide | 2 |
| HRWR (DARACEM 100) | 0.5 |
| ¼" Perlite | 175 |
| Water | 205 |
| ⅛–½" Length Mineral or Graphite Fiber | 10 |

The procedure of Example 8 was repeated except that fiber was included as part of this composition. The compressive strengths and impact strength were essentially the same, but the products were lighter in weight (60 pcf) than the products of Example 8.

Example 10 to 12 that follow are representative of products which contain pozzolanic binder free of hydraulic cement.

EXAMPLE 10

| Example 10 | |
|---|---|
| Components | Parts by Weight |
| Kiln Dust | 100 |
| Class F Fly Ash | 500 |
| Fume Silica or Calcined Fuller's Earth | 50 |
| Sand | 250 |
| Silica Flour | 100 |
| Sodium Hydroxide | 4 |
| Water | 175 |

The procedure of Example 1 was followed and 115 pcf, 3,750 psi compressive strength products resulted after 7 days closed curing at 75° F. This composition contained no Portland cement and is suitable for flooring type products; i.e., for casting floors and flooring tile and brick.

EXAMPLE 11

| Example 11 | |
|---|---|
| Components | Parts by Weight |
| Kiln Dust | 50 |
| Fly Ash | 500 |
| Fume Silica | 50 |
| Sand | 300 |
| Sodium Hydroxide | 4 |
| Water | 175 |

The procedure of Example 1 was followed and 3,200 psi compressive strength, 112 pcf density products obtained when closed cured for 7 days at 75° F. These, again, are suitable for flooring type products.

EXAMPLE 12

| Example 12 | |
|---|---|
| Components | Parts by Weight |
| Kiln Dust | 50 |
| Fly Ash | 500 |
| Fume Silica or Calcined Fuller's Earth | 50 |
| Sand | 200 |
| Silica Flour | 100 |
| Water | 185 |
| Sodium Hydroxide | 2 |

The procedure of Example 1 was followed and the products obtained closed cured at different temperatures. The results are a product having a wet density of 115–120 pcf and a compressive strength of 3,500 psi if closed cured at 75° F. for 7 days, 3,750 psi if cured at 212° F. for 4 hours, 5,000 to 6,000 psi if cured at 350° F., and 6,000 to 7,000 psi when fired at 1,800° F. in a conventional clay brick kiln.

EXAMPLE 13

| Example 13 | |
|---|---|
| Components | Parts by Weight |
| Kiln Dust | 50 |
| Class F Fly Ash | 500 |
| Calcined Fuller's Earth | 50 |
| Portland Cement | 140 |
| Sodium Hydroxide | 2 |
| HRWR (DARACEM 100) | 0.5 |
| ¼" Perlite | 175 |
| Clay | 300 |
| Water | 205 |

The composition was formed as in Example 1 and then fed through a commercial extruder and both cylindrical rods and bars were formed; the rods formed were 1 inch in diameter and 2 inches long and the bars were in 1½×2½ inches in cross-section and up to 24 inches long.

The closed cured (boiled 4 hours at 212° F. or aged 7 days at 750° F.) extrudates achieved compressive strengths of 2,350 psi at 72 pcf dry density when tested with the procedure of ASTM C396.

EXAMPLE 14

| Example 14 | |
|---|---|
| Components | Parts by Weight |
| Kiln Dust | 50 |

Example 14

| Components | Parts by Weight |
| --- | --- |
| Class F Fly Ash | 500 |
| Calcined Fuller's Earth | 50 |
| Portland Cement | 140 |
| Sodium Hydroxide | 2 |
| HRWR (DARACEM 100) | 0.5 |
| EXTENDOSPHERES | 206 |
| Clay | 300 |
| Water | 205 |

The procedure of Example 12 was followed except the EXTENDOSPHERES was substituted for the perlite. The closed cured (boiled 4 hours at 212° F. or aged 7 days at 75° F.) extrudate achieved average compressive strengths of 3,700 psi at a 75 pcf dry density when tested in accordance with the procedure of ASTM C579.

EXAMPLE 15

| Components | Parts by Weight |
| --- | --- |
| Kiln Dust | 100 |
| Fly Ash | 500 |
| Calcined Fuller's Earth | 50 |
| Sand | 250 |
| Silica Flour | 100 |
| Clay | 250 |
| Water | 225 |
| Sodium Hydroxide | 4 |

The procedure of Example 12 was followed except that the extruded products were in the rectangular form of a conventional brick. The brick averaged a 115–120 pcf bulk density and a compressive strength of 6,000–7,000 psi if fired to 1,800° F., 3,500–3,750 psi if closed cured at room temperature for 7 days, or, if autoclaved at 350° F. for 3–4 hours, a 6,000–7,000 psi compressive strength.

EXAMPLE 16

| Components | Parts by Weight |
| --- | --- |
| Hydrated Lime | 20 |
| Class F Fly Ash | 500 |
| Portland Cement | 80 |
| Sand | 250 |
| ¼" Gravel | 500 |
| Sodium Hydroxide | 1 |
| HRWR (DURACEM 100) | 2 |
| Bentonite | 20 |
| Water | 142 |

The dry solids were blended in an industrial blender. Water and HRWR were added, and blending continued for five minutes until a dust-free, slightly dampended mass resulted. The mass was granular and easily conveyed to a centrifugal molding machine where four-foot (2 foot diameter) and eight-foot (3 foot diameter) lengths of pipe were formed, immediately demolded from steel cylinder clam-shell molds, and allowed to stand free, covered for 8 hours with a gentle, saturated steam injection by a single source steam hose under a canvas, draped canopy. A 24-hour compressive strength of 3400 psi (120 pcf) and a 72-hour compressive strength of 4950 psi was measured on 6"×12" standard cylinders, molded during production.

EXAMPLE 17

| Components | Parts by Weight |
| --- | --- |
| Hydrated Lime | 20 |
| Class F Fly Ash | 500 |
| Portland Cement | 80 |
| Sand | 350 |
| ¼" Gravel | 500 |
| Sodium Hydroxide | 1 |
| HRWR (DURACEM 100) | 2 |
| Bentonite | 20 |
| Water | 142 |

Cast two-inch cubes were formed and cured 24 hours at room temperature, followed by four hours at 100° C. saturated steam or water immersion, and tested for compressive strength. Strengths of 6350 psi were obtained at 118 pcf density as molded.

EXAMPLE 18

A. The composition and procedure of Example 17 were used and followed, but using 350 parts of silica sand (acid resistant) plus 500 parts of silica gravel (acid resistant). Two-inch cubes were prepared as in Example 17 above and cured for 24 hours at room temperature, followed by four hours at 100° C., 100% relative humidity. While two cubes were immersed in a 0.70 pH sulfuric acid, the third was compression tested and found to yield 5850 psi.

B. Results of Acid Immersion: When calcareous aggregates and fillers are replaced with quartz or siliceous fillers, free of limestone, the resistance to sulfuric acid is greatly improved. After two weeks of immersion in accordance with ASTM C-297, only a 0.2% weight loss was experienced. A white, softened skin of about 1/32" depth forms on the surface and resists gentle, manual massage with fingers or light brushing with a nylon paint brush. Severe scrubbing with a stiff bristle brush after a 7-day exposure to acid resulted in a 0.3% weight loss on a similar companion. The compressive strengths after four weeks measured 5325 psi.

EXAMPLE 19

Examples 16 to 18 are repeated, except that the hydrated lime is replaced with 50 parts of kiln dust, in one instance, and bypass cement ash, in another, which contain 40–60% calcium oxide/calcium is replaced hydroxide. When formulated and processed as in Example 16, the results were comparable to those in Example 16.

EXAMPLE 20

Examples 16 to 19 are repeated, except that the portland cement is replaced with high alumina cement (Fondu by Lone Star LaFarge and Lumnite by Lehigh Cement Co.) at 50–150 ppw. Such a substitution contributes to a 2300° F. resistant cement which can serve as a fire brick when properly dried and fired prior to continuous service. Compressive strengths vary from 3000–6000 psi with the range of cement identified above. Working time or pot life is reduced compared to that of Portland cement.

EXAMPLE 21

Examples 16 to 19 are repeated, except that in each test Type I, II, III or IV (typically used for the oil and gas downhole grouting) are substituted for the portland cement used therein. Alternatively, plaster of paris ($CaSO_4 \frac{1}{2} H_2O$) may added to or substituted for the hydraulic cements. When such substitutions are made, attention must be given to the effects on working time (pot life processing times, etc.) as the alternative cements exhibit faster or slower setting times.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A low cost cement composition that can be admixed with water and closed cured to give acid-resistant products of high compressive strength consisting essentially of, in parts by weight, 1 to 1.5 parts of a calcium oxide material containing at least about 60% CaO, 10 to 20 parts of pozzolanic material containing at least about 30% by weight amorphous silica, and 0.025 to 0.075 parts by weight of an alkali metal catalyst.

2. The composition of claim 1 wherein said calcium oxide material is a kiln dust, quick lime, slake lime or mixture thereof.

3. The composition of claim 2 wherein said pozzolanic material is, in addition to said amorphous silica, a fly ash, blast furnace slag, fume silica, bagasse ash, rice hull ash, volcanic ash, diatomaceous earth, calcined fuller's earth, diatomaceous silica, or mixtures thereof.

4. The composition of claim 3 wherein the alkali metal catalyst is sodium hydroxide, postassium hydroxide, sodium silicate, potassium silicate, or a mixture thereof.

5. The composition of claim 1, including an expanded filler selected from hollow glass cenospheres, perlite, expanded polystyrene beads, glass or polymer microspheres, vermiculite, or mixtures thereof.

6. The composition of claim 1 including ceramic, graphite, or plant fibers.

7. The composition of claim 1 including a portland cement, high alumina cement, or plaster of paris.

8. A low cost, high compressive strength cementitious building material consisting of a closed cured composition consisting essentially of a low cost, high strength, hydrothermal cement composition that can be admixed with water and closed cured to give products of high compressive strength consisting essentially of, in parts by weight, 1 to 1.5 parts of a calcium oxide material containing at least about 60% CaO, 10 to 20 parts of pozzolanic material containing at least about 30% by weight amorphous silica, and 0.025 to 0.075 parts by weight of an alkali metal catalyst.

9. The material of claim 8 wherein said calcium oxide material is a kiln dust, quick lime, slake lime or mixture thereof.

10. The material of claim 9 wherein said pozzolanic material is, in addition to said amorphous silica, a fly ash, blast furnace slag, fume silica, bagasse ash, rich hull ash, volcanic ash, diatomaceous earth, calcined fuller's earth, diatomaceous silica, or mixtures thereof.

11. The material of claim 10 wherein the alkali metal catalyst is sodium hydroxide, potassium hydroxide, sodium silicate, potassium silicate, or mixtures thereof.

12. The material of claim 10 including an expanded filler selected from hollow glass cenospheres, perlite, expanded polystyrene beads, glass or polymer microspheres, vermiculite, or mixtures thereof.

13. The material of claim 10 including ceramic, graphite, or plant fibers.

14. The material of claim 10 including a portland cement, high alumina cement, or plaster of paris.

15. The method of making a low-cost, high compressive strength cement comprising forming a pulverulent hydrothermal cement composition consisting essentially of, in parts by weight, 1 to 1.5 parts of a calcium oxide material containing at least about 60% CaO, 10 to 20 parts of pozzolanic material containing at least about 30% by weight amorphous silica, and 0.025 to 0.075 parts by weight of an alkali metal catalyst, adding sufficient water thereto to permit closed curing of said composition, forming said admixture to the shape of building material desired, and closed curing said shape at ambient temperature or above.

16. The method of claim 15 wherein said calcium oxide material is a kiln dust, quick lime, slake lime or mixture thereof.

17. The method of claim 16 wherein said pozzolanic material is, in addition to said amorphous silica, a fly ash, blast furnace slag, fume silica, bagasse ash, rice hull ash, volcanic ash, diatomaceous earth, calcined fuller's earth, diatomaceous silica, or mixtures thereof.

18. The method of claim 17 wherein the alkali metal catalyst is sodium hydroxide, potassium hydroxide, sodium silicate, potassium silicate, or mixtures thereof.

19. The method of claim 18 including including an expanded filler selected from hollow glass cenospheres, perlite, expanded polystyrene beads, glass or polymer microspheres, vermiculite, or mixtures thereof.

20. The method of claim 19 including ceramic, graphite, or plant fibers.

21. The method of claim 20 including a portland cement, high alumina cement, or plaster of paris.

* * * * *